United States Patent
Tarraf (10) Patent No.: US 6,351,495 B1
(45) Date of Patent: Feb. 26, 2002

(54) APPARATUS AND METHOD FOR CONVEYING TTY SIGNALS OVER WIRELESS TELECOMMUNICATION SYSTEMS

(75) Inventor: Ahmed A. Tarraf, Bayonne, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/143,416

(22) Filed: Aug. 28, 1998

(51) Int. Cl.[7] .................. H04L 27/00; H04M 11/00; H04M 1/00
(52) U.S. Cl. .................. 375/259; 379/52; 455/557
(58) Field of Search ................ 375/259, 219; 379/52, 88, 93.17, 93.18; 320/342; 704/221; 455/553, 556, 557

(56) References Cited

U.S. PATENT DOCUMENTS

| | | | |
|---|---|---|---|
| 4,813,040 A | * 3/1989 | Futato | 370/528 |
| 5,388,146 A | * 2/1995 | Morduch et al. | 379/52 |
| 5,974,116 A | * 10/1999 | Engelke et al. | 379/52 |
| 6,205,339 B1 | * 3/2001 | Leung et al. | 455/553 |

* cited by examiner

Primary Examiner—Chi Pham
Assistant Examiner—Khai Tran
(74) Attorney, Agent, or Firm—Steve Mendelsohn (57) ABSTRACT

An apparatus and method for conveying teletype signals over a wireless telecommunication system. When the apparatus receives a teletype signal, it derives information carried by said signal and represents said information as at least one message. The at least one message and/or the teletype signal is transmitted over the wireless telecommunication system. When the apparatus receives a signal from the wireless telecommunication system that it determines to be a teletype signal, the apparatus of the present invention decodes the teletype information from part of the received signal determined as not having been adversely affected by the telecommunication system.

8 Claims, 4 Drawing Sheets

APPARATUS AND METHOD FOR CONVEYING TTY SIGNALS OVER WIRELESS TELECOMMUNICATION SYSTEMS

CROSS REFERENCES

This application is related to a commonly assigned and concurrently filed application entitled "Method for Conveying TTY Signals Over Wireless Communication Systems" filed on Aug. 28, 1998 with Serial No. 09/143,417

BACKGROUND OF THE INVENTION

1. Field of the Invention

The present invention provides a method for conveying teletype (TTY) signals carrying teletype information over a wireless communication system and more particularly to an apparatus and method in which the teletype information is represented as a message so that the teletype information can be reliably conveyed over the wireless telecommunication system.

2. Description of the Related Art

Teletype terminals are part of telecommunication technology developed more than 30 years ago. The teletype terminals are equipment that were designed to transmit and receive teletype signals where such teletype signals contain information arranged in accordance with a well known signaling protocol such as Baudot signaling. A signaling protocol is a set of rules followed by a provider of a communication system that defines how information is to be encoded, transmitted, received and decoded by equipment of the communication system. The Baudot signaling protocol has remained virtually unchanged for the past 30 years. Baudot signaling is an analog signaling protocol in which analog signals are used to digitally encode information that are conveyed over a telephony system such as the Public Switched Telephone Network (PSTN).

There are still many active teletype terminals in the United States and throughout the world. Many users of these active terminals still transmit and receive information in accordance with the 45.45 baud Baudot analog signaling protocol or other similar protocols. In the 45.45 baud Baudot signaling protocol, each character is coded as an 8 bit block of information comprising 1 start bit, 5 information bits and 2 stop bits where each bit is 22 milliseconds in length. Thus, 45.45 baud (1/22msec.) represents the speed at which the information is conveyed and can be generally referred to as the information rate. The actual information is represented by the 5 information bits. The start bit, which is usually defined as a "0" bit and the stop bits, which are usually defined as "1" bits, indicate the beginning and end of each 8 bit block of information respectively. For many signaling protocols, including the Baudot signaling protocol, the 8 bit block of information usually represents an alphanumeric character. An 8 bit block of information is commonly referred to as an 8 bit word. The start and stop bits are typically referred to as synchronization bits and are part of signaling information. Signaling information is information used by the system that enable the system to properly transmit, receive and process information. The Baudot signaling protocol being an analog signal protocol, each bit is represented by a tone (i.e., a single frequency sinusoid). Thus, a "0" bit is represented by an 1800 Hz tone and a "1" bit is represented by a 1400 Hz tone.

With the advent of wireless telecommunication systems, owners of teletype terminals have attempted to transmit and receive teletype signals over such systems. Moreover, the Federal Communications Commission (FCC) has adopted rules requiring providers of wireless telecommunication systems to ensure that teletype users can access Emergency 911 services over wireless telecommunication systems. The Emergency 911 services are the well known types of services typically provided via the PSTN (or other communication network) in which a subscriber of the PSTN simply dials 911 to obtain emergency assistance from local authorities (e.g., police dept., fire dept., hospital/ambulance services). However, system providers have discovered that the teletype terminals have performed poorly over wireless telecommunication systems. One indication of poor performance is the ratio of the number of erroneous characters received to the total number of characters transmitted; this ratio is known as the Character Error Rate (CER). Several studies and trials conducted by various wireless equipment manufacturers confirm the poor performance (e.g., unacceptably high CER) of teletype communications over wireless telecommunication systems. The following are some of the more recent studies: *E911 TDD Compatibility Testing With IS*-136, Jan. 22, 1998, Ericsson Corp.; *E911 TDD Compatibility to GSM*, 1998, Ericsson Corp.; *TTY Study using Vocoder direct link* Gallaudet University Technology Assessment Program; *TTY/TDD Compatibility Measurements Preliminary Results"*, May 1998, Nokia Corp.; *TDD Communications over CDMA* September 1997, Qualcomm Inc.; *"Initial TTY Report"* May 1998, Sprint PCS.

It is widely thought that the poor performance of teletype communications over wireless telecommunication systems is due to the use of vocoders in such systems. Vocoders are speech coding systems designed to represent human voice as mathematical models comprising various parameters. Also, vocoders comprise speech coding systems that simply digitize analog voice signals into Pulse Coded Modulation (PCM) samples (i.e., bit streams) without any mathematical parameter modeling. The parameters are transmitted and received over wireless telecommunication channels. At the transmit end, a vocoder produces a set of parameters for every basic timing interval of the wireless telecommunication system. The basic timing interval is part of a format being followed by a wireless telecommunication system. The format is a particular method of arranging and structuring information to be conveyed over a wireless telecommunication system. The basic timing interval is a period of time during which a block of information representing, for example, voice, data, video and other communication signals, is conveyed. For certain wireless telecommunication systems such as Code Division Multiple Access (CDMA) wireless telecommunication systems, the basic timing interval is commonly referred to as a frame. Each frame contains a plurality of digital bits representing digitally encoded information. At the receive end, another vocoder uses the received parameters to reproduce human voice. In current CDMA wireless telecommunication systems the frame is 20 milliseconds long and some of the vocoders used are known as a QUALCOMM Code Excited Linear Predictive Coder (QCELP 13k or 8k) and the Enhanced Variable Rate Coder (EVRC).

Signals that do not originate from human speech such as tones are sounds that can adversely impact the quality and accuracy of the mathematical model parameters produced by the vocoders; thus, the ability of a vocoder at the receive end to accurately reproduce such signals would also be adversely affected. Many have reasoned that since teletype signals (i.e., tones) are not sounds typically produced by human voice, some vocoders have difficulty in reproducing such signals resulting in the poor performance of teletype signals when conveyed over wireless telecommunication systems. However, tests and performance studies have shown that the poor performance of teletype signals conveyed over wireless telecommunication systems is mainly due to the quality of the communication channels of these systems and not to the use of vocoders. The quality of these communication channels may be such that the conveyed teletype signals are damaged to the extent that an unacceptably high information error rate (i.e., high CER) results.

Figure 1:
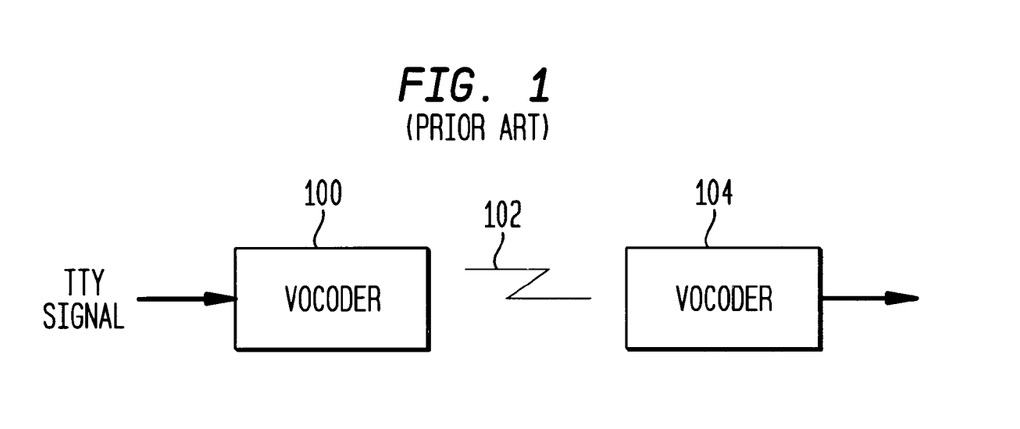
FIG. 1 depicts a prior art test setup for measuring information error rate of a communication of a wireless telecommunication system.

Referring to FIG. 1, there is shown a test setup designed to evaluate the performance of teletype signals over an ideal communication channel of a CDMA system using QCELP 13k vocoders. At the transmit end teletype signals from a teletype terminal (not shown) are fed to vocoder 100 which produces the mathematical model parameters. The parameters produced by vocoder 100 are transmitted as frames over communication channel 102. In this setup, communication channel 102 is designed to be ideal in the sense that the transmitted frames experience no adverse effects. Adverse effects are any existing conditions in the communication channels of the wireless telecommunication system which cause errors to occur in the information being conveyed through the system. A non-zero information error rate, which is usually defined as the ratio of erroneous information to total information, directly results from the adverse effects.

In an actual CDMA wireless telecommunication system, the frames would be transmitted as radio frequency (RF) signals over the air and/or other communication channel media. Depending on the quality of the communication channels being used, a certain percentage of the transmitted frames would be adversely affected and thus such frames (i.e., "bad frames") would contain erroneous bits. Usually, a Frame Error Rate (FER) is associated with a wireless telecommunication system where the FER is typically defined as the ratio of bad frames to the total number of frames transmitted through communication channels of the wireless telecommunication system. Communication channel 102 has a 0% FER. For other wireless communication systems, a corresponding information error rate known as the Bit Error Rate (BER) is an indicator of the quality of the communication channels for those systems.

Vocoder 104 receives the transmitted frames and reproduces the teletype signals whose CER is then measured. It is found that at 0% FER the CER of the teletype signals is also 0% for the test setup of FIG. 1. In a test of an actual CDMA system using a QCELP 13k vocoder it was found that an FER barely under 1% yields a CER of about 7%. The same test was conducted for a Time Division Multiple Access (TDMA) wireless telecommunication system, which uses a different type of vocoder known as an Algebraic Code Excited Linear Predictive (ACELP) vocoder, yielded the same results. Similar tests for other types of wireless systems such as Global System for Mobile Communication (GSM) yielded similar results. Moreover, under acceptable communication channel conditions (nearly 0% FER or 0% BER), different types of wireless telecommunication systems (e.g., CDMA, TDMA, GSM, PCS) yielded about a 1% CER for teletype signals. However, for a 1% FER or higher, the CER increased dramatically.

A quantitative analysis of teletype signals transmitted through a less than ideal communication channel of a CDMA wireless telecommunication system further confirms that the dominant cause for the poor performance of the teletype signals is due to the relative quality (manifested by an unacceptably high FER, or high information error rate) of the communication channel. In particular, for a CDMA wireless telecommunication system, 300 teletype characters were transmitted through a channel whose FER is 1%. The teletype characters complied with the 45.45 baud Baudot signaling protocol. Each frame of the CDMA system is 20milliseconds long. Therefore the number of frames in 300 characters is 2640 frames (i.e., 300 char. ×8 bits/char.× 22msec./bit x (1frame/20msec)). A 1% FER is therefore equivalent to 26.4 bad frames for 300 transmitted characters. In a worst case scenario each bad frame produces one bit error in a different character leading to 26.4 character errors. The CER is thus (26.4/300) ×100 =8.8%. The relationship between the FER and the CER is defined by the formula CER=8.8 FER. In a typical CDMA system, the average FER is 2% which could result in a CER of up to 17.6% for teletype communications.

Based on the above discussion it is evident that the dominant factor that affects teletype communications over wireless telecommunication systems is the information error rate (e.g., FER, BER) of the system. In order to achieve reliable teletype communications over a wireless telecommunication system, the effect of the system's information error rate on the teletype signals must somehow be attenuated as much as possible.

Therefore, there exists a need to convey (i.e., transmit and receive) teletype signals over wireless telecommunication systems in such a manner that any adverse effects (manifested as information errors) on the teletype signals due to the quality of the communication channels of the system is substantially attenuated.

SUMMARY OF THE INVENTION

The present invention provides an apparatus and method for conveying teletype signals carrying teletype information over a wireless telecommunication system in a reliable manner. The teletype signal processor is configured to receive signals and determine whether the received signal is a teletype signal. When the signal is determined not to be a teletype signal, teletype signal processor does not process the signal. When the received signal is determined to be a teletype signal, the teletype signal processor is configured to derive the teletype information from the teletype signal. The teletype signal processor then represents the derived teletype information as at least one message. In one embodiment of the method and apparatus of the present invention, the teletype signal processor transmits the at least one message in place of the teletype signal. In other embodiments of the present invention, the teletype signal processor transmits the at least one message along with the received teletype signal.

The teletype signal processor of the present invention is further configured to determine whether a received signal is arranged in accordance with the embodiments discussed above. In particular, teletype signal processor determines whether the received signal comprises a teletype signal and at least one message representing teletype information or comprises at least one message that represents teletype information. When it is determined that the received signal is at least one message representing teletype information or a teletype signal and at least one message, teletype signal processor then determines which part of the received signal and/or message has been adversely affected by the wireless telecommunication system. Any part of the received signal and/or message determined to have been adversely affected by the wireless telecommunication system is discarded and any remaining parts are kept for further processing. The teletype information is then decoded from the remaining parts of the teletype signal and/or message.

The teletype signal processor of the present invention comprises a receiver and a transmitter. The receiver is configured to receive signals from the wireless telecommunication system and determine whether said signals are teletype signals and/or messages representing teletype information. The receiver further decodes the teletype information from part of the received signal determined as not having been adversely affected by the wireless telecommunication system. The transmitter is configured to receive signals and determine whether such signals are teletype signals. When it is determined that the signal received by the transmitter is a teletype signal, any information carried by said teletype signal is derived and is represented as at least one message. The transmitter then transmits the at least one message over the wireless telecommunication system. In another embodiment of the present invention, the transmitter transmits the teletype signal along with the at least one message.

DETAILED DESCRIPTION

Figure 2:
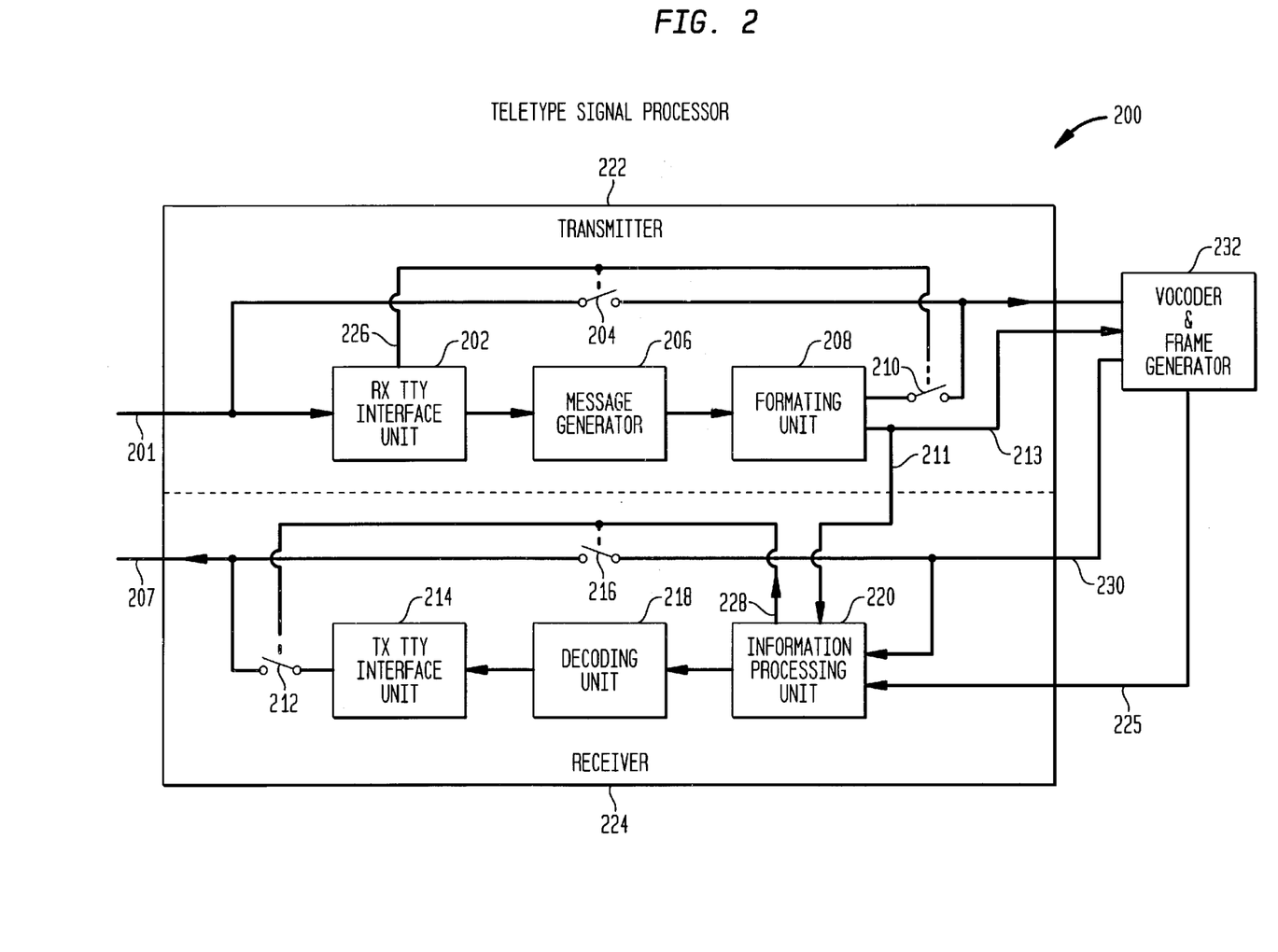
FIG. 2 depicts the teletype signal processor of the present invention.

The present invention provides a teletype signal processor for reliably conveying teletype signals over a wireless telecommunication system. Referring to FIG. 2, there is shown an apparatus of the present invention, i.e., teletype signal processor 200. Teletype signal processor 200 comprises transmitter 222 and receiver 224. Transmitter 222 receives signals from sources (such as a teletype terminal) via path 201. Transmitter 222 first determines whether the received signal on path 201 is a teletype signal. If the received signal on path 201 is not a teletype signal, Transmitter 222 bypasses such signal via switch 204 onto Vocoder and Frame Generator 232. If the received signal on path 201 is determined to be a teletype signal, Transmitter 222 derives any information (i.e., teletype information) contained in said signal and represents said signal as at least one message. Transmitter 222 then transfers the at least one message to Vocoder and Frame Generator 232 which transmits said at least one message over a wireless telecommunication system via well radio equipment (not shown). Transmitter 222 sends control signals via path 213 instructing Vocoder and Frame Generator 232 to transmit only the at least one message or transmit the at least one message along with the teletype signal received by transmitter 222.

Receiver 224 receives signals from a wireless telecommunication system on path 230. Receiver 224 first determines whether the received signal on path 230 is a signal containing teletype information in the form of a message and teletype signals as discussed above. If the received signal on path 230 is not a teletype signal, Receiver 224 causes said received signal to be bypassed through switch 216 onto path 207. If the received signal is a teletype signal (i.e., at least one message, or at least one message and teletype signal), then Receiver 224 decodes the teletype information from part of the received signal that Receiver 224 has determined as not having been adversely affected by the wireless telecommunication system. Therefore, the method and apparatus of the present invention allows teletype information to be decoded even if the teletype signal carrying such information has been adversely affected by the wireless telecommunication system.

Still referring to FIG. 2, Transmitter 222 comprises RX teletype interface 202 coupled to Message Generator 206 which is coupled to Formatting Unit 208. RX teletype interface 202, which receives teletype signals on path 201 originating from a teletype terminal (not shown), is configured to derive the information contained in the teletype signals. For the sake of simplicity and for illustrative purposes only, a teletype signal representing the character "A" complying with the 45.45 baud Baudot signaling protocol is the signal received by RX teletype interface 202; the 8 bit word for the character "A" is 01100011 and is to be conveyed over a CDMA wireless telecommunication system which transmits information in the form of frames where each frame is 20 milliseconds in length. At various times the CDMA wireless telecommunication system conveys signaling information in accordance with formats known as Blank and Burst and Dim and Burst. In Blank and Burst, frames which normally contain speech information representing voice signals are blanked and the speech information is replaced with signaling information. In Dim and Burst, part of the frames are blanked and the blanked portions are replaced with signaling information. Thus, in Dim & Bust, each frame has a signaling portion and an information portion. When neither Blank & Burst nor Dim & Burst formats are being used, i.e., in normal operation, the frames contain voice or other types of information.

RX teletype interface unit 202 first determines whether the received signal is a teletype signal or other signal such as a voice signal. If RX teletype interface unit 202 determines that the received signal is not a teletype signal it generates a TX BYPASS signal on path 226 which causes switch 204 to close and switch 210 to open allowing the received signal to pass through transmitter 222 without being processed. The signal is processed by Vocoder and Frame Generator 232. Vocoder and Frame Generator 232 converts the signal to mathematical parameters and the parameters are formatted in accordance with a format being followed by the wireless telecommunication system and are provided to an RF radio transmitter (not shown) for transmission over the wireless telecommunication system. When RX teletype interface 202 determines that a signal it has received is a teletype signal it generates a TX PROCESS signal on path 226 which causes switch 204 to open and switch 210 to close allowing the signal to be processed by transmitter 222. RX teletype interface 202 then derives the information, as discussed if above, (i.e., the 8 bit word 01100011) contained in the teletype signal. In particular, RX teletype interface 202 derives the 8 bit word by first detecting the start of the word and then framing a block of time equal to 176 milliseconds during which each of the 8 bits are derived in accordance with the 45.45 baud Baudot signaling protocol. Thus, when RX teletype interface 202 detects an 1800 Hz tone for a period of 22 milliseconds, the tone is determined to be a "0" bit. Similarly, when RX teletype interface 202 detects a 1400 Hz tone for 22 milliseconds, the tone is determined to be a "1" bit. RX teletype interface 202 is implemented with well known circuitry designed to detect signals comprising specific frequency components. One such implementation is the use of filters tuned to the frequencies used for the Baudot 45.45 baud signaling scheme. The derived information and the teletype tones are then fed to message generator 206. For other type of teletype signals, similar circuitry can also be used. The derived information is then transferred to Message Generator 206.

Message Generator 206 generates a message corresponding to the character being transmitted, i.e., the message represents a teletype character. The messages are in the form of a block of bits (e.g., 8 bit word) or other well known digital and/or analog forms. An example of an analog form is to have the messages as a complex tone comprising a plurality of different tones. The messages generated by Message Generator 206 have a particular message format (e.g., certain bits in certain positions). For example, all messages have the first, fourth and eight bits as "1" bits; this particular bit pattern is used to detect messages after they have been transmitted over the wireless telecommunication system. Message Generator 206 can use error detection techniques, such as parity bit coding, as part of the format of its messages. A plethora of other techniques for devising a particular message format can be used. One possible technique for the generation of the message is for Message Generator 206 to have a lookup table that contains a message corresponding to the information contained in the teletype signal. Thus, for example, the lookup table has a message for the character "A" which message is retrieved by Message Generator 206. Message Generator 206 also digitizes the signaling tones.

The digitized tones and the message are then transferred to Formatting Unit 208. Formatting Unit 208 arranges each digitized tone into a format being followed by the wireless telecommunication system and also arranges the message in accordance with the same format. For example, for the character A, eight frames would be created corresponding to each digitized tone that represents one of the eight bits for character "A." An additional frame is also created for the message generated by Message Generator 206. Formatting Unit 208 then transfers either the message or the digitized tones or both to Vocoder & Frame Generator 232 depending on which format is being used to convey information over the wireless telecommunication system. Formatting Unit 208 generates control signals on path 213 (and path 211) instructing Vocoder and Frame Generator 232 as to which format the information (i.e., digitized tones and/or message) is to be transmitted over the wireless telecommunication system. Vocoder and Frame Generator 232 also formats information into frames. Information generated by the Vocoder (i.e., mathematical parameters) are arranged into frames by the Frame Generator. For simplicity, the operations performed by the Vocoder and the Frame Generator are represented by Vocoder & Frame Generator 232. The frames generated by Vocoder and Frame Generator 232 will hereinafter be referred to as transmission frames. The transmission frames and the frames generated by Formatting Unit 208 have the same formats, but they can also follow different formats. The method of the present invention takes advantage of the various formats of a CDMA system or any wireless system that conveys information in terms of blocks of information. The method of the present invention has three basic modes of operation.

The first mode of operation is the Blank and Burst mode in which Vocoder and Frame Generator 232 is instructed by Formatting Unit to format the next eight transmission frames as Blank and Burst frames. In this mode of operation, Formatting Unit 208 transmits only the message to Vocoder and Frame Generator 232. Vocoder and Frame Generator 232 blanks out the next eight transmission frames and fills such frames with the message from Formatting Unit 208. The eight transmission frames, each containing the message, are transferred to radio equipment (not shown) and transmitted over the wireless telecommunication system. Thus, even if some of the transmission frames are adversely affected by the wireless telecommunication system, the remaining transmission frames can be used to determine the character. It should be readily understood that the present invention can be such that more than one message is used to represent a particular character. Thus, the character "A" can be represented by one, two or more different messages, which messages are sent as separate transmission frames over the wireless telecommunication system. It is therefore not necessary to have transmission frames containing the same message. Further, Vocoder and Frame Generator 232 can be instructed to transmit different numbers of frames; it is not necessary that eight frames be transmitted. For example, five transmission frames can be transmitted instead of eight transmission frames.

The second mode of operation is the Dim and Burst mode in which Formatting Unit 208 instructs Vocoder & Frame Generator 232 (via path 213) to format the next eight transmission frames as Dim and Burst frames. Formatting Unit 208 transfers the message and the eight frames (representing teletype tones) to Vocoder and Frame Generator 232. The frames representing the teletype tones are processed by the Vocoder and are placed in the information portion of the transmission frames by the Frame Generator. The message is placed in the blanked portion of each of the transmission frames. The transmission frames are transmitted where each frame contains voice information and the message generated by Message Generator 206. Again, as in the Blank and Burst mode, the number of frames used need not be eight and more than one message can be used to represent the teletype character being transmitted.

In the third mode of operation, Formatting Unit 208 transfers the eight frames representing the eight tones of the teletype signal and also transfers the message (representing a teletype character) to Vocoder and Frame Generator 232. Formatting Unit 208 generates control signals on path 213 (and on path 211) instructing Vocoder and Frame Generator 232 to operate in the third mode. The eight frames representing the eight tones are processed by the Vocoder and are arranged as eight transmission frames by the Frame Generator. Additionally, a ninth transmission frame containing the message is also arranged by the Frame Generator. The eight transmission frames are transmitted followed by the ninth transmission frame which contains the message.

Still referring to FIG. 2, receiver 224 comprises Information Processing Unit 220 coupled to Decoding Unit 218 which is coupled to TX teletype interface unit 214. Information Processing Unit receives signals from the wireless telecommunication system (via path 230 and Vocoder and Frame Generator 232) and determines whether such signals are teletype signals. When Information Processing Unit determines that the received signals are teletype signals it generates an RX PROCESS signal (on path 228) causing switch 216 to open and switch 212 to close allowing the received signal to be processed by receiver 224. When Information Processing Unit determines that the received signal is not a teletype signal it generates an RX BYPASS (on path 228) signal causing switch 216 to close and switch 212 to open allowing the signal to pass through receiver 224 without being processed.

Information Processing Unit 220 determines whether the received signal is a teletype signal by detecting whether the signal is arranged as per the format being followed by the method of the present invention and the mode of operation established by Formatting Unit 208 or the wireless telecommunication system. Information Processing Unit 220 can use well known processing techniques to make such a determination. Path 225 from Vocoder and Frame Generator 232 instructs Information Processing Unit as to which format (Blank & Burst; Dim & Burst or normal operation) is being followed by the system. Path 211, which contains control signals generated by Fomatting Unit 208 establishing the particular mode of operation of transmitter 222, is also provided to Information Unit 220. Information Processing Unit will use the information from paths 225 and 211 to assist it in determining whether the received signal is a teletype signal.

In either Dim and Burst format or the normal format (i.e., second and third modes), any received frames or portions of frames representing teletype tones are processed by the vocoder of Vocoder and Frame Generator 232. However the entire received signal (teletype portion, if any, and messages) is transferred to receiver 224. Information Processing Unit 220 arranges the received signal in accordance with the format of the system (i.e., frames for CDMA system) and the format indicated by path 225 (i.e., Blank & Burst, Dim & Burst, normal operation). If path 225 does not indicate a format, Information Processing Unit 220 arranges the received signal in accordance with the mode of operation indicated by path 211. Information Processing Unit 220 then analyzes the portion of the received signal which are allegedly messages. For example, in the first mode of operation, Information Processing Unit 220 will search for eight frames of messages which are formatted in accordance with the format being followed by Message Generator 206. If the received signal does not have any messages that follow the format of Message Generator 206 then Information Processing Unit 220 generates an RX BYPASS signal. If a particular message format is detected, then the entire signal (e.g., eight message frames or eight message and tone frames or eight tone frames plus one message frames) is transferred to Decoding Unit 218.

Decoding unit 218 performs an analysis on the arranged received signal to determine which part of the arranged received signal that has not been adversely affected by the wireless telecommunication system. Several well known techniques such as Fourier analysis and digital filtering can be used to calculate the spectral content of the received signal and determine whether the received signal has been adversely affected by the wireless telecommunication system. One possible scheme is to determine, via Fourier analysis, the overall energy level of the received signal based on the energy level of each of the various spectral components of the signal. Any part of the received signal which has an energy level below a defined threshold is considered to have been adversely affected and is discarded. The threshold is defined by a wireless system provider or a manufacturer of wireless equipment. The remaining part of the signal is further processed to identify and decode the teletype information and/or the message carried by such signal. For the given example (i.e., character "A" being conveyed in 45.45 baud Baudot protocol) the teletype information is decoded into an 8 bit word; the messages are decoded into a block of bits such as an 8 bit word. Each block of bits has a bit pattern. If any of the tones representing bits of the 8 bit word has been adversely affected Decoding unit 218 can use the messages to decode the teletype information. Thus, Decoding unit 218 can use either the received tones or the received messages or both to decode the teletype information. One way of decoding the teletype information from the message (for the first and second modes) is to select the block of bits (i.e., message bits) whose bit pattern is repeated the most. The bit pattern that is mostly repeated is selected as the teletype information.

The decoded teletype information is transferred to TX teletype interface unit 214 which converts it to a teletype signal such as a 45.45 baud Baudot signal.

Figure 3:
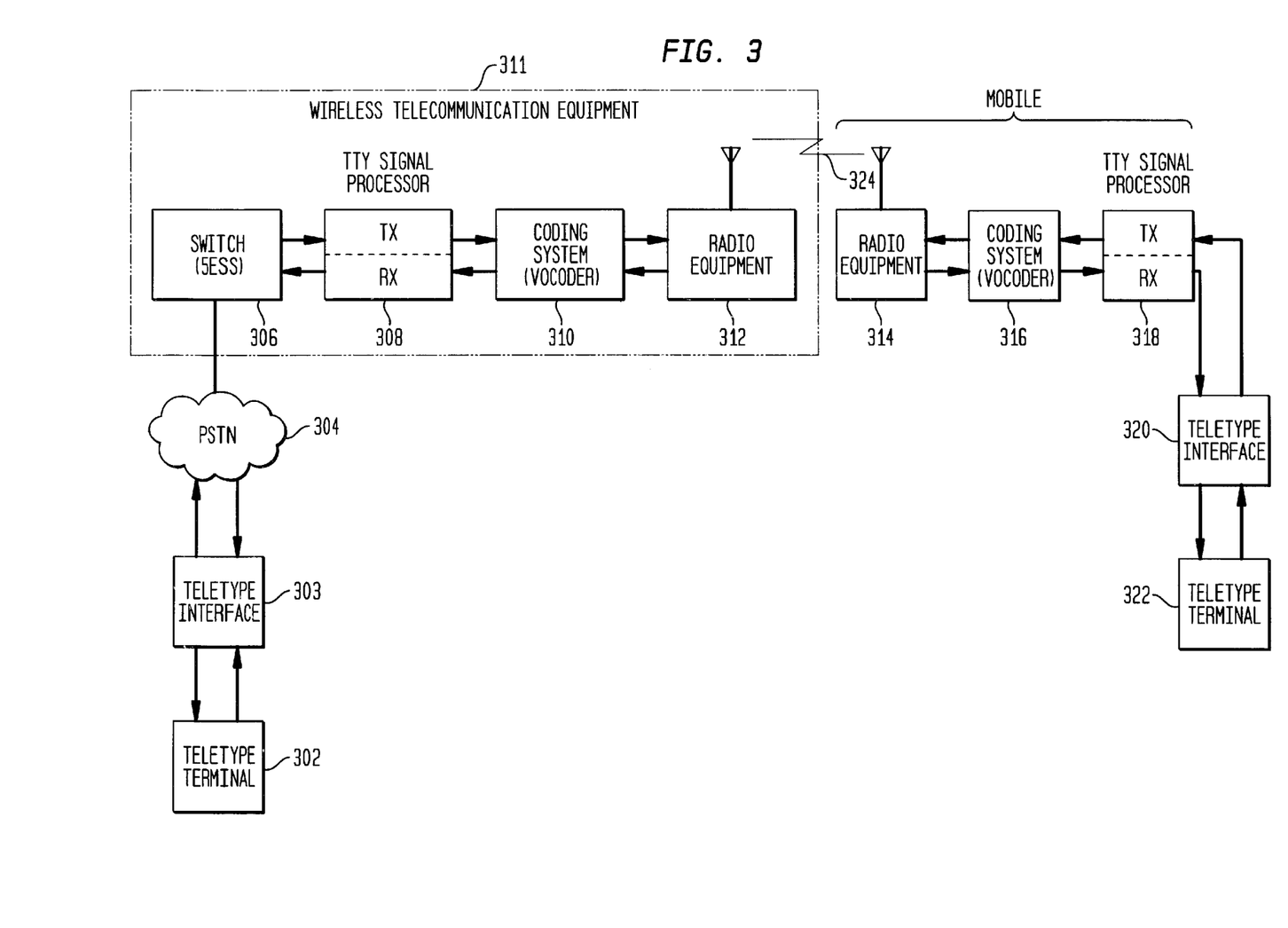
FIG. 3 depicts the teletype signal processor being used in a wireless telecommunication system.
Figure 4:
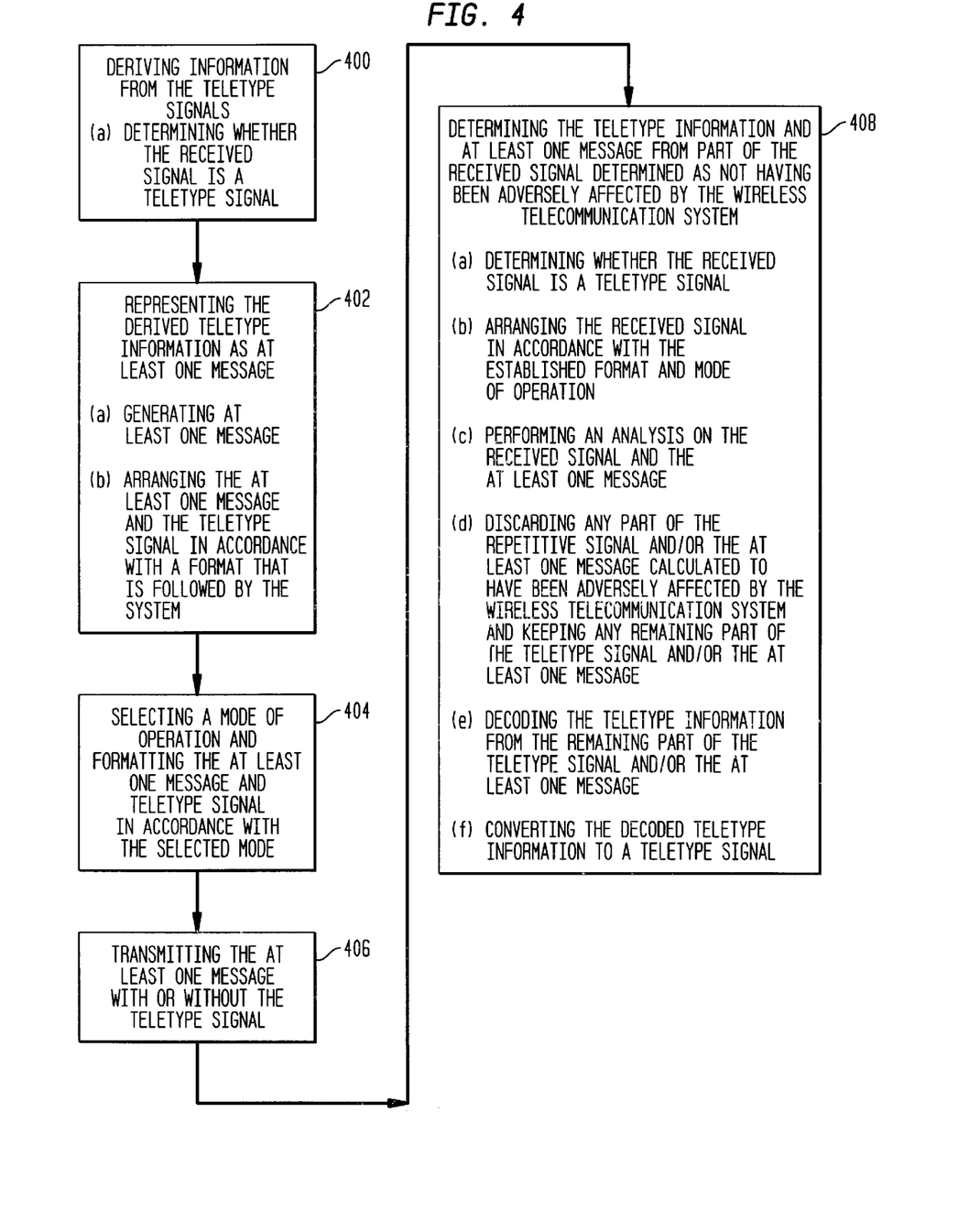
FIG. 4 depicts the method of the present invention.

The method of the present invention is now discussed with reference to FIGS. 3 and 4. In FIG. 3 there is shown a wireless telecommunication equipment 311 (hereinafter "equipment 311"). Equipment 311 comprises switch 306 coupled to the TTY Signal Processor 308 of the present invention which is coupled to Coding system 310 (i.e., a vocoder) which is coupled to radio equipment 312. Coding system 310 although shown as a separate entity from switch 306 is usually part of the switch; it is shown here as being separate from the switch only for clarity purposes. Radio Equipment 312 transmits and receives RF signals over wireless communication channel 324 to a plurality of subscribers one of which is represented by the mobile equipment (314, 316 and 318). For the sake of simplicity, equipment 311 is shown coupled to one mobile station. In an actual wireless telecommunication system, equipment 311 is coupled to a plurality of mobile stations. Teletype terminal 302 is coupled to equipment 311 via teletype interface 303, and PSTN 304. Teletype interface 303 processes teletype signals such that they can be conveyed over PSTN 304. Switch 306 is a communication switch that typically routes communication signals from various subscribers of a communication system (e.g., PSTN) to communication node of another communication system. Switch 306 is a 5ESS switch manufactured by Lucent Technologies of Murray Hill, New Jersey. Other switches manufactured by other companies can also be used. Equipment 311 further comprises teletype signal processor 308, coding system 310 and radio equipment 312. Teletype signal processor 308 is configured and is operated in accordance with the apparatus of the present invention as shown in FIG. 2 and discussed supra. Coding system 310 performs signal processing (e.g., vocoder speech processing) on communication signals transmitted and received by equipment 311. Radio equipment 312 comprises well known transmitter/receiver and modulation circuitry typically used by wireless telecommunication systems.

Teletype terminal 302 transmits a teletype signal (e.g., character "A") to the PSTN via interface 303. The signal is first received by Switch 306 of wireless equipment 311. Teletype signal processor 308 receives the signal from Switch 306 and in step 400 of FIG. 4, derives the information from the teletype signal. In step 400a, the derivation of the information from the received teletype signal first involves determining whether the received signal is a teletype signal. When the signal has been determined to be a teletype signal, the teletype information is derived as discussed supra.

In step 402, teletype signal processor 308 represents the teletype information as at least one message or a plurality of messages. The plurality of messages can be one message repeated a certain number of times or different messages representing the teletype information. In step 402a teletype signal processor 308 generates at least one message that represents the teletype information. In step 402b teletype signal processor 308 arranges the at least one message and the teletype signal in accordance with a format being followed by the wireless telecommunication system. In step 404, teletype signal processor selects one of the three modes of operation discussed supra, and formats the at least one message and the teletype signal (when applicable) in accordance with said selected mode of operation.

In step 406 the at least one message with or without the teletype signal is transmitted over communication channel 324 via coding system 310 and radio equipment 312. The signal having been received and processed by radio equipment 314 and coding system 316 is received by teletype signal processor 318 of the mobile station. It should be noted that teletype signal processors 308 and 318 are both configured and operate in accordance with the apparatus (see FIG. 2) and method of the present invention.

In step 408, teletype signal processor 318 determines the teletype information and at least one message from part of the received signal calculated as not having been adversely affected by the wireless telecommunication system. In particular, in step 408a, teletype signal processor 318 determines whether the received signal is a teletype signal; that is a teletype signal arranged in accordance with one of the three modes of operation of the present invention. In step 408b, teletype signal processor 318 arranges the received signal and the at least one message in accordance with the established format and mode of operation indicated by the wireless telecommunication system or the transmitter portion of TTY signal processor 318 (i.e., the Formatting Unit of processor 318). In step 408c teletype signal processor 318 performs an analysis on the received signal and the at least one message. In step 408d, based on the analysis, any part of the received signal and the at least one message determined as having been adversely affected by the wireless telecommunication system is discarded and is not processed any further. Any remaining part of the teletype signal and/or message are kept for further processing. In step 408e, the remaining part of the signal and/or message are used to decode the teletype information. In step 408f, the decoded teletype information is converted to a teletype signal and transferred to teletype terminal 322 via teletype interface 320. It should be noted in the first mode of operation, there is no teletype information that is decoded. The teletype signal is converted from decoding the at least one message. For the second and third modes of operation, the method of the present invention uses any of several techniques to determine which decoded information to select as the correct information when there is a conflict between the decoded teletype information and the decoded message. A possible scheme that can be used (for second and third modes of operation) when the decoded message is not the same character as the decoded teletype information, is that the method of the present invention selects the message after confirming that no error occurred from a review of parity bits encoded in the message.

It should be noted that the method and apparatus of the present invention can still be part of wireless telecommunication equipment 311 regardless of whether individual mobile equipment (i.e., users of the system) are equipped with the apparatus of the present invention. Those users who are not equipped with the apparatus of the present invention (e.g., mobile equipment does not have processor 318) can still receive and decode teletype information when the apparatus of the present invention (that is part of wireless telecommunication 311) is operating in the second and third modes.

I claim:

1. A teletype signal processor for teletype signals comprising one or more teletype information bits and one or more teletype start or stop bits over a wireless telecommunication system, the teletype signal processor comprising:

a transmitter configured to derive the teletype information bits from the teletype signals, represent the derived teletype information bits as at least one message in accordance with a format, and transmit said at least one message over the wireless telecommunication system or transmit said at least one message and the teletype signals over the wireless telecommunication system; and a receiver configured to receive signals from the wireless telecommunication system, determine whether such received signals are teletype signals carrying teletype information in accordance with the format, and decode the teletype information from part of the received signals determined as not having been adversely affected by the wireless telecommunication system.

2. The teletype signal processor of claim 1 wherein the transmitter comprises a RX Teletype Interface Unit coupled to a Message Generator which is coupled to a Formatting Unit where the RX Teletype Interface Unit is configured to receive analog signals, determine whether the received signals are teletype signals, derive the teletype information bits from the teletype signals, and transfer the derived teletype information bits to the Message Generator.

3. The teletype signal processor of claim 1 wherein the receiver comprises an Information Processing Unit coupled to a Decoding Unit which is coupled to a TX Teletype Interface Unit where the Information Processing unit is configured to receive signals from the wireless telecommunication system, determine whether such signals are teletype signals, arrange the received signals in accordance with a format being followed by the wireless telecommunication system, and transfer the arranged received signals to the Decoding Unit.

4. The teletype signal processor of claim 2 wherein the Message Generator is configured to generate at least one message in accordance with a message format that represents the teletype information bits derived from the teletype signals and transfer the at least one message and the received signals to the Formatting Unit.

5. The teletype signal processor of claim 4 wherein the Formatting Unit is configured to arrange the teletype signals and the at least one message in accordance with a format being followed by the wireless telecommunication system.

6. The teletype signal processor of claim 3 wherein the Decoding Unit is configured to perform an analysis of the arranged received signals received from the Information Processing Unit, decode the teletype information from the part of the received signals determined as not having been adversely affected by the wireless telecommunication system, and transfer the decoded teletype information to the TX teletype interface unit.

7. The teletype signal processor of claim 6 wherein the TX teletype interface unit converts the decoded teletype information received from the Decoding Unit to a teletype signal.

8. A method for conveying teletype signals comprising one or more teletype information bits and one or more teletype start or stop bits over a wireless telecommunication system, the method comprising the steps of:

receiving a first signal;

deriving one or more teletype information bits from the received first signal, representing said one or more teletype information bits as at least one message in accordance with a format, and transmitting said at least one message with or without the received first signal over the wireless telecommunication system when it is determined that the received first signal is a teletype signal; and receiving a second signal from the wireless telecommunication system, decoding teletype information from part of the received second signal determined as not having been adversely affected by the wireless telecommunication system when it has been determined that the received second signal comprises either at least one message representing teletype information or a teletype signal along with at least one message representing teletype information.

* * * * *